April 24, 1934.    T. A. CHEATHAM    1,955,735
SAFETY HUB CAP
Filed Dec. 23, 1929
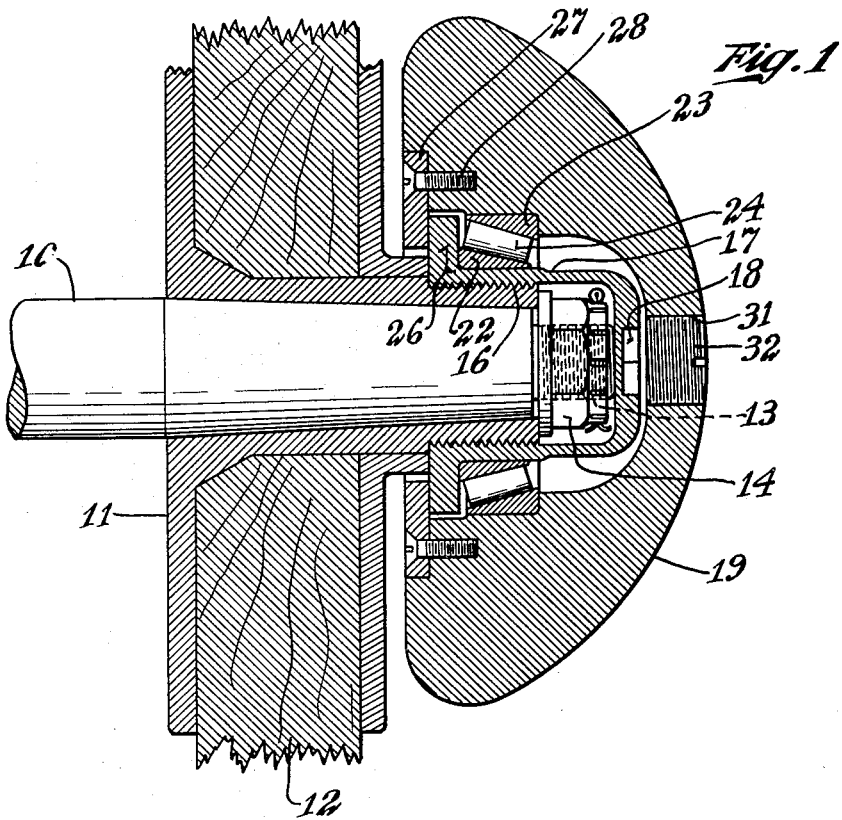
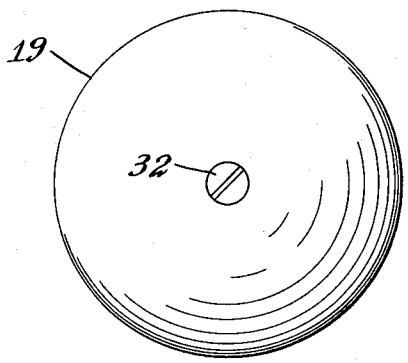
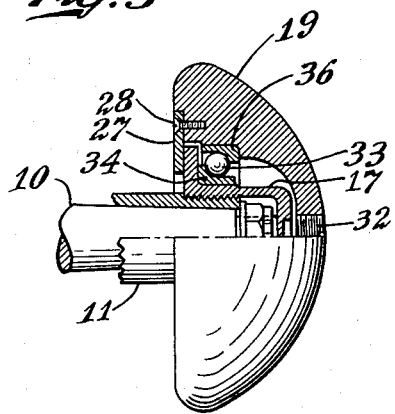
INVENTOR
Thomas A. Cheatham
BY
Johnston & Jennings
ATTORNEYS Patented Apr. 24, 1934

1,955,735

UNITED STATES PATENT OFFICE 1,955,735

SAFETY HUB CAP

Thomas A. Cheatham, Birmingham, Ala.

Application December 23, 1929, Serial No. 416,049

6 Claims. (Cl. 301—108)

My invention relates to safety hub caps for vehicle wheels, more particularly for automobile wheels, and has for its object to provide a hub cap which tends to protect the hub, wheel and car against damage when striking other objects, and, by having a rotatable convex protector, to decrease liability to interlock with or injure objects it strikes.

As is well known, hub caps for automobile wheels, as heretofore made, are rigidly secured to the hubs and when striking other objects such as walls, posts, etc., tend to hang and are damaged or broken off. Furthermore, the hanging or frictional engagement between the hub cap and objects prevents further progress of the vehicle until the wheel is pulled clear thereof.

It is accordingly the principal object of my invention to provide a hub cap, which upon striking other objects, rotates and disengages the wheel from the object without damage. In carrying out my invention, I provide a rigid protecting cover for the hub, and rotatably mount a rounded externally convex cap over the cover. In order to insure free rotation of the cap, I interpose antifriction bearings, such as ball or roller bearings, between the cover and the cap, and provide means for preventing accidental disassembly of the device.

Apparatus embodying features of my invention is illustrated in the accompanying drawing, forming a part of this application, in which:—

Fig. 1 is a sectional view through an automobile wheel hub and showing my improved safety hub cap applied thereto;

Fig. 2 is an end elevation of my improved hub cap, and

Fig. 3 is a view partly in section and partly in elevation showing a modified form of my invention.

Referring to the drawing for a better understanding of my invention, I show an axle 10 over which is fitted the hub 11 of an automobile wheel 12 only a fragment of the latter being shown. The axle is provided with a reduced threaded portion 13 on its outer end over which is screwed a nut 14 for holding the hub in place on the axle.

The hub is threaded on its outer end at 16 and over this threaded outer end is screwed a cover 17. The cover 17 is provided with a recess 18 in its outer end for accommodating a wrench in applying it and removing it.

Telescoping over the cover 17 is my improved safety hub cap which comprises a relatively heavy rounded externally convex metal member 19 having a central recess fitting over the cover 17. Fitted over the cover 17 is a roller bearing race 22 and carried by the cap 19 is a cooperating outer roller bearing race 23, roller bearings 24 being disposed between the two races.

The cover 17 is provided with an outwardly extending flange 26 over which fits a ring 27 secured to the cap 19 by means of screws 28, which ring and retaining means prevent disassembly of the apparatus.

The outer end of the cap 19 is provided with a central opening 31 through which access may be had to the recess 18 in the cover 17 for applying and removing the assembled apparatus. When the apparatus is in place on a vehicle hub as shown, the opening 31 is closed by means of a screw 32.

The device shown in Fig. 3 is similar, in all essential respects to that shown in Fig. 1, with the exception that I show ball bearing members 33, cooperating between an inner ball bearing race 34 carried by the cover 17 and an outer ball bearing race 36 carried by the cap 19.

With my improved device, it will be seen that should the convex rotatable hub cap strike any object, such as a wall or post or other vehicle, instead of hanging and endangering the hub cap and the wheel itself, it will tend to deflect the wheel and by rotating it will insure instant disengagement of the wheel, thus preventing damage.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A safety vehicle hub cap, comprising a cover adapted to be screwed onto a hub, and having a recess in its outer end for receiving a wrench, a rounded externally convex protecting cap telescoping over the cover and having an opening therein disposed closely adjacent to, and giving access therethrough to the said recess, a bearing means to rotatably mount the cap on the cover, and demountable retaining means co-acting between the cap and cover to prevent disassembly thereof.

2. A safety automobile hub guard means, consisting of an internal hub cap screwed onto the hub and having a wrench socket in its outer end, and an external guard member recessed to receive said cap, bearing means on the cap to permit free rotation of the guard member, said guard member having an opening therein closely adjacent to and giving access to said wrench socket in the cap to permit the removal of the hub guard assembly as a whole.

3. In a safety automobile hub guard means, an internal hub cap having a wrench socket in its outer end, an external guard member having a central opening giving access to said socket, means to mount said external member rotatably upon said internal hub cap, and a removable screw closing said opening in the guard.

4. A safety automobile hub guard means comprising an internal member fixedly secured on a hub and having an inner collar, an external guard member rotatably mounted on said inner member and having a demountable retaining ring coacting with said collar to hold said members assembled, and a thrust bearing interposed between the said members and disposed by a gravitational movement of the outer member to cause a frictional engagement between said ring and collar, said bearing responsive to any external violence being disposed to give and release the frictional engagement between said ring and collar to allow the outer member to rotate freely on the inner member, as and for the purposes described.

5. A safety automobile hub guard means comprising an internal hub cap fixedly secured on a hub and a strong non-resilient metallic guard member having a bearing interposed between it and said internal hub cap and disposed in a transverse plane which intersects the hub thereby to transmit thrust on said bearing directly to said hub, said guard member having its external face rounded with symmetric convexity throughout sufficient to deflect objects colliding therewith and thereby diminish the force of their impact on the guard member.

6. In a device of the character described, a hub cap, a bearing element carried by the hub cap, a freely rotatable hub guard having an external symmetrically convex surface and an internal recess the outer end of which extends close to the center of said convex surface, and a bearing element interposed in the inner end of said recess and coacting with said first mentioned bearing element to support the guard for free rotation on the hub cap with the center of its convex face closely juxtaposed to the outer end of said hub cap.

THOMAS A. CHEATHAM.